(12) United States Patent
Glover et al.

(10) Patent No.: US 10,346,815 B2
(45) Date of Patent: Jul. 9, 2019

(54) SYSTEM AND METHOD OF DISTRIBUTED, SELF-REGULATING, ASSET-TRACKING CRYPTOCURRENCIES

(71) Applicant: Kowala Cayman SEZC, Nashville, TN (US)

(72) Inventors: Eiland Glover, Nashville, TN (US); John W. Reitano, Nashville, TN (US)

(73) Assignee: Kowala Cayman SEZC, George Town, Grand Cayman (KY)

( * ) Notice: Subject to any disclaimer, the term of this patent is extended or adjusted under 35 U.S.C. 154(b) by 0 days.

(21) Appl. No.: 16/140,407

(22) Filed: Sep. 24, 2018

(65) Prior Publication Data

US 2019/0095880 A1    Mar. 28, 2019

Related U.S. Application Data

(60) Provisional application No. 62/561,844, filed on Sep. 22, 2017, provisional application No. 62/694,750, filed on Jul. 6, 2018.

(51) Int. Cl.
*G06Q 20/06* (2012.01)
*H04L 9/06* (2006.01)
*G06F 16/18* (2019.01)

(52) U.S. Cl.
CPC ....... *G06Q 20/065* (2013.01); *G06F 16/1805* (2019.01); *H04L 9/0643* (2013.01); *H04L 2209/38* (2013.01); *H04L 2209/56* (2013.01)

(58) Field of Classification Search
None
See application file for complete search history.

(56) References Cited

U.S. PATENT DOCUMENTS 9,747,586 B1 *   8/2017 Frolov ............... G06Q 20/0655
2016/0012424 A1   1/2016 Simon et al.
(Continued)

FOREIGN PATENT DOCUMENTS

WO       2017/145004 A1    8/2017
WO    WO 2017/145004     *  8/2017 ........... G06Q 20/065

OTHER PUBLICATIONS

Migeul Castro & Barbar Liskov, "Practical Byzantine Fault Tolerance", Proceedings of the Third Symposium on Operating Systems Design and Implementation, New Orleans, USA, Feb. 1999.
(Continued)

*Primary Examiner* — Olabode Akintola
(74) *Attorney, Agent, or Firm* — Andre J. Bahou; Christopher T. McNeill; Waller Lansden Dortch & Davis, LLP (57) ABSTRACT

The system and method disclosed herein includes a family of distributed, self-regulating, asset-tracking cryptocurrencies using blockchain technology. One embodiment, such as a computer-implemented method, may include maintaining a stable value of an asset token relative to a value of an underlying target asset. Further, the computer-implemented method may include minting the asset token in variable quantities, applying stability fees or rewards in variable quantities, and obtaining market feedback to determine the variable quantities of fees to apply, rewards to issue, and asset tokens to mint. Market feedback may include a market price of the asset token and other data obtained from exchanges and oracles. Oracles may be used in certain embodiments to report prices and support smart contracts that aid in regulating price stability. A consensus mechanism may also be used to allow participants in the decentralized system to agree on the advancement blockchain data in an orderly way.

17 Claims, 5 Drawing Sheets

(56) References Cited

U.S. PATENT DOCUMENTS

| | | | |
|---|---|---|---|
| 2016/0246802 A1* | 8/2016 | Regni | G06F 16/2343 |
| 2016/0246834 A1* | 8/2016 | Regni | G06F 16/2343 |
| 2017/0075941 A1 | 3/2017 | Finlow-Bates | |
| 2017/0236120 A1 | 8/2017 | Herlihy et al. | |
| 2017/0352012 A1* | 12/2017 | Hearn | G06Q 20/065 |
| 2018/0268382 A1* | 9/2018 | Wasserman | G06Q 20/0655 |
| 2018/0365106 A1* | 12/2018 | Huang | G06F 11/1084 |

OTHER PUBLICATIONS

Lawrence H. White, "Dollar-Dominated Cryptocurrencies: Flops and Tethered Success", https://cato.org/blog/dollar-dominated-cryptocurrencies-flops-tethered-success, Apr. 6, 2017.

Gautier Marin, "A Tour of the Cosmos for Developers", https://blog.cosmos.network/a-tour-of-cosmos-for-developers-7517ba1b4045, Nov. 23, 2017.

Sam Aiken, "Biggest misconception about Tether market cap and why it's totally different from all other coins", https://medium.com/crypto-punks/tether-misconceptions-2984430e7e48, Feb. 6, 2018.

"Introduction", https://web.archive.org/web/20170927092307/https://tendermint.readthedocs.io/projects/tools/en/master/introduction.html, Sep. 27, 2017.

Atul Singh, Tathagata Das, Petros Maniatis, Peter Druschel, & Timothy Roscoe, "BFT Protocols Under Fire", NSDI vol. 8, p. 189-204, Apr. 16, 2008.

International Search Report for PCT App. No. PCT/US2018/052492 dated Feb. 26, 2019.

Written Opinion of the International Searching Authority for PCT App. No. PCT/US2018/052492 dated Feb. 26, 2019.

* cited by examiner

Maintaining a stable value of an asset token relative to a value of an underlying target asset
302

Minting the asset token in variable quantities
304

Obtaining feedback from a trading market to determine the variable quantities of the asset tokens to mint
306

Maintaining a stable value of an asset token relative to a value of an underlying target asset
402

Applying a variable transaction fee to decrease a quantity of the asset tokens in circulation
404

Obtaining feedback from a trading market to determine the variable transaction fee
406

SYSTEM AND METHOD OF DISTRIBUTED, SELF-REGULATING, ASSET-TRACKING CRYPTOCURRENCIES

The present application claims the benefit of Provisional Application No. 62/561,844, filed Sep. 22, 2017, and Provisional Application No. 62/694,750, filed Jul. 6, 2018, the contents of which are incorporated by reference.

TECHNICAL FIELD

The present invention generally relates to cryptocurrencies and more particularly to systems and methods of distributed, self-regulating, asset-tracking cryptocurrencies.

BACKGROUND

Conventional cryptocurrencies can exhibit significant and undesirable volatility. Such volatility dissuades parties from adopting and using such cryptocurrencies. Conventional cryptocurrencies may attempt to use some value-pegging mechanisms to stabilize the cryptocurrencies, with these mechanisms generally falling into the two categories of "asset-backed" mechanisms and "non-asset-backed mechanisms." The asset-backed mechanisms are not effective because they are vulnerable to the actions of governments, financial institutions, and other technical problems. Further, the asset-backed mechanisms do not provide a solution to these problems because they are subject to price manipulations, fake order books, flash crashes, and illegitimate audits. The non-asset-backed mechanisms are not effective because they are vulnerable to loss of large-scale, active third-party participation when the demand for the primary token of the cryptocurrency drops over a long period of time.

SUMMARY

The present disclosure generally relates to improved distributed, self-regulating, asset-tracking cryptocurrencies that help overcome the failures value-pegging mechanisms in of conventional cryptocurrency systems. More particularly, the present disclosure relates to a novel application of varying minting quantities for a cryptocurrency, varying rewards, and varying fees associated with cryptocurrency transactions. The present disclosure utilizes a technical solution to obtain a trusted and accurate consensus of market feedback on the value or price of a cryptocurrency to overcome price manipulations. More particularly, the present disclosure may implement a consensus protocol for a blockchain system that maintains a stable value cryptocurrency while retaining certain benefits, such as decentralization, security, privacy, speed of transfer, and lower transaction costs. Furthermore, the burning mechanisms of the present disclosure will operate without the need for large-scale, active third-party participation and, therefore, removes the requirement for this participation Embodiments disclosed herein solve the aforementioned technical problems and may provide other benefits as well, including publicly viewable algorithms that solve the price manipulation problem. One aspect of the present disclosure includes a computer-implemented method that includes the steps of maintaining a stable value of an asset token relative to a value of an underlying target asset, minting the asset token in variable quantities, and obtaining feedback from a trading market to determine the variable quantities of the asset tokens to mint. The feedback may include a market price of the asset token.

Another embodiment of the invention contemplates a computing system including a processor and memory configured to perform the operations of maintaining a stable value of an asset token relative to a value of an underlying target asset, minting the asset token in variable quantities, and obtaining feedback from a trading market to determine the variable quantities of the asset tokens to mint. Yet another embodiment of the invention contemplates a non-transitory computer-readable storage medium, having stored thereon instructions executable by a computer to perform the steps of maintaining a value of an asset token relative to a value of an underlying target asset, applying a variable transaction fee to decrease a quantity of the asset tokens in circulation, and obtaining feedback from a trading market to determine the variable transaction fee.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate exemplary embodiments of the invention. Together with the description, they serve to explain the objects, advantages, and principles of the invention. In the drawings.

DETAILED DESCRIPTION

Reference will now be made in detail to exemplary embodiments of the invention, some aspects of which are illustrated in the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, summary, or the following detailed description.

The present disclosure is directed to a system and method for a distributed, self-regulating, asset-tracking cryptocurrency. The cryptocurrency may include an asset token. As discussed herein, the systems and methods of the present disclosure provide a stable cryptocurrency that generally tracks and maintains the market value of an asset token of the cryptocurrency relative to the value of a target asset. A stable cryptocurrency tracking a target asset may include regulating the price of the asset token relative to a unit price of the target asset. In some embodiments, the target asset tracked by the cryptocurrency system may include some type of asset whose value can be measured, including but not limited to USD, EUR, WY, and other fiat currencies, as well as various commodities such as oil, gold, stocks, etc. The price of the asset token may be expressed in terms of a unit price of the target asset (e.g., the price of an asset token may be $1.02 USD). In some embodiments, regulating the price of the asset token relative to a unit price of a target asset may include maintaining the asset token at a substantially stable value substantially equal to the value of a unit of the target asset. For example, regulating an asset token that tracks the U.S. dollar may include the maintaining the asset token at a price of $1.00 USD. Leveraging blockchain technology, and one or more regulation method, including but not limited to variable minting of quantities of a cryptocurrency, variable removal of units of the cryptocurrency from circulation, and deterministic selection of a block-proposing node for a block in a blockchain system allows, for example, an asset-tracking cryptocurrency to maintain a generally stable value. In some embodiments, this stable value or target price for an asset token of the cryptocurrency can generally equal the value of a unit of the target asset (e.g. $1.00 USD).

Figure 1:
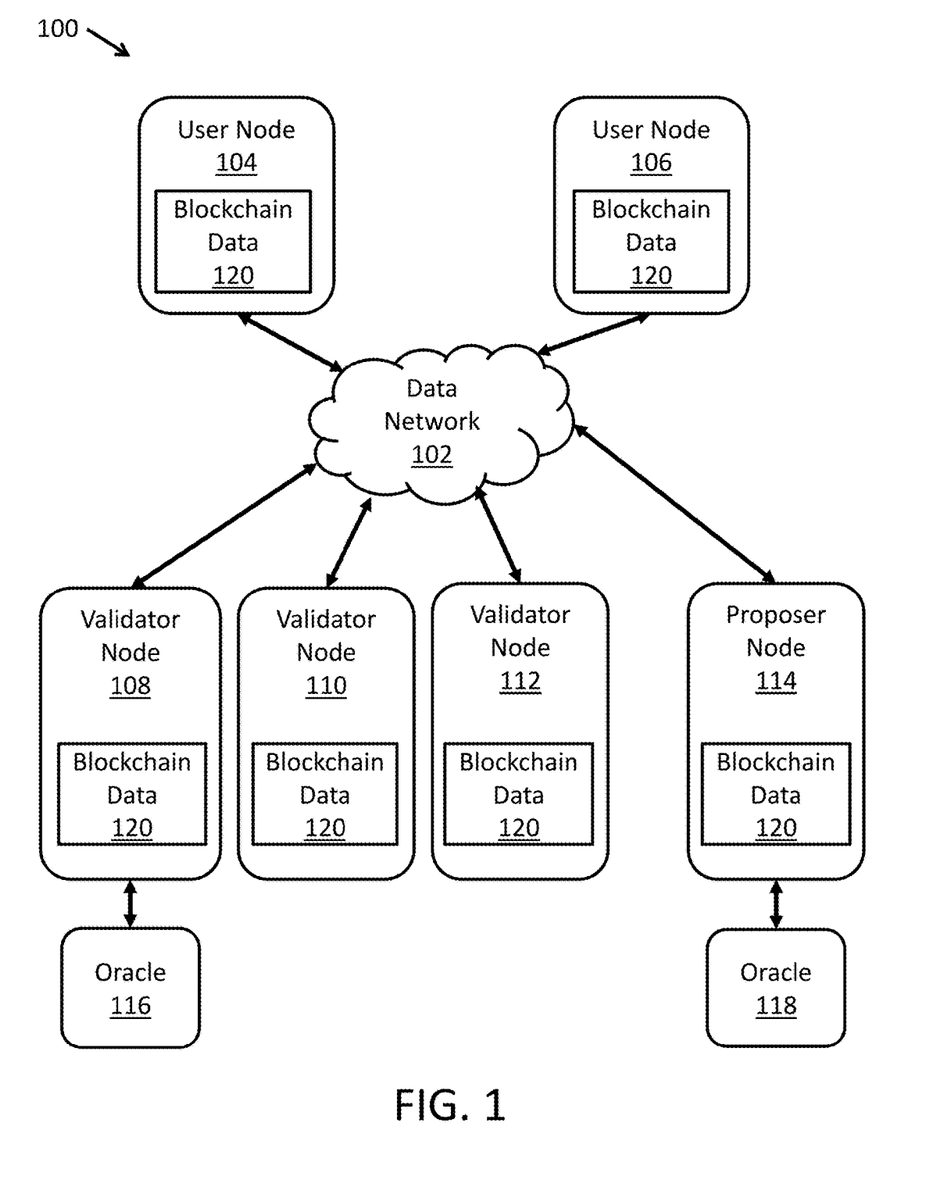
FIG. 1 is a schematic block diagram illustrating one embodiment of a system for distributed, self-regulating, asset-tracking cryptocurrencies.

FIG. 1 depicts an exemplary distributed, self-regulating, asset-tracking cryptocurrency system 100 implemented in a blockchain system incorporating certain aspects of the disclosed embodiments. The blockchain cryptocurrency system may monitor and track transactions with respect to asset tokens within the cryptocurrency system. By way of example, FIG. 1 shows a data network 102 (such as the Internet), a plurality of nodes, and a plurality of oracles.

In one embodiment, a node may comprise one or more user nodes (104, 106), a validator node (108, 110, 112), and a proposer node 114. A node may include other types of nodes that interact with the blockchain system and may communicate with other nodes or other components of the blockchain system via the data network 102. A node may include a hardware implementation, a software implementation, or a combination of hardware and software. In one embodiment, a validator node 108, 110, 112 or the proposer node 114 may be associated with or receive data from an oracle 116, 118. A user node 104, 106, validator node 108, 110, 112, and proposer node 114 may each include blockchain data 120 for the cryptocurrency system. The blockchain data 120 may include a copy of the blockchain of the system 100, a portion of the blockchain, a digest of the blockchain, or other types of blockchain data. The validator nodes (108, 110, 112) and the proposer node 114 can access the blockchain data 120 to request, verify, and/or add blocks onto the blockchain for the system 100 as transactions occur, such actions being instigated by one or more user nodes 104, 106. The system 100 may allow the user node (104, 106), validator node (108, 110, 112), or proposer node 114 to maintain a stable value of an asset token relative to a unit price of a target asset, as described in more detail below.

In some embodiments, one blockchain can be used to track, monitor, and verify transactions for more than one asset token type. In other embodiments, a separate blockchain system may be dedicated to each type of asset token (which may be signified as a "k" followed by the underlying fiat currency abbreviation) (e.g. one blockchain for kUSD, another for kEUR, another for kJPY, etc.). The separate blockchains can be in communication with one another such that users can trade between the different asset token systems.

In some embodiments, the proposer node 114 determines the variable quantities of the asset tokens to be minted, the removal of variable quantities of the asset tokens, and assembles the block of trading activity received from various nodes, such as the user 104. Other nodes that run the minting algorithms, the stability algorithms, the burning algorithms, and calculate fees, rewards, and vote on consensus may help return an asset token to its target price or maintain the asset token at its target price. The ability of the asset token to eventually return to its target price via regulation of the system may create opportunities for traders seeking to profit from slight fluctuations in asset token market prices relative to the target price. The variable minting and variable removal of quantities of the asset token may be based on feedback obtained from a trading market, cryptocurrency exchange, or other trading platform for the asset token.

In one embodiment, determining the variable quantity of minted asset tokens may include calculating the quantity of minted asset tokens for a block. In an exemplary embodiment, the variable quantity of minted asset tokens minted by the proposer node 114 may include the mintedAmount(b) according to the following formula:

$$mintedAmount(b) := \begin{cases} 42 & b = 1 & \text{(initial)} \\ mintedAmount(b-1) & b \bmod n \neq 1 & \text{(no-change)} \\ \min(UP \times mintedAmount(b-1), cap(b)) & \begin{array}{l} b > 1, b \bmod n = 1, \\ p(b) \geq p(b-1) \geq 1 \end{array} & \text{(ratchet-up)} \\ \max\left(\frac{mintedAmount(b-1)}{DOWN}, 0.000001\right) & \text{otherwise} & \text{(ratchet-down)} \end{cases}$$

where b is a block number, UP and DOWN are adjustment factors, cap(b) is a minted amount cap, n is an interval size, and p(b) is a market price of the asset token for the block.

In one embodiment, the first block in the blockchain (the genesis block) may include a block number of "1," the second block may include a block number of "2," and so on. The UP and DOWN factors may include a block-by-block adjustment, may change each time the proposer node 114 assembles a block, and/or at some other interval "n." For example, the adjustment factor 'UP' may be set to 1.050 and the adjustment factor 'DOWN' may be set to 1.777, or they may each be set to other numbers. The interval size, n, may be set to various values. In one embodiment, n may be set to 900 or some other number. For example, if n=900, the minted amount may change every 900 blocks. If n=1, the minted amount may change every block.

In one embodiment, cap(b) may include a minted amount cap for the block b. Using a cap may result in that, after an initial growth period, the minted amount not growing larger than one basis point of an entire available token supply. In some embodiments, cap(b) may be calculated according to the following formula:

$$cap(b) := \begin{cases} 0.0001 \times availableCoins(b-1) & \begin{array}{l} b > 1, \\ availableCoins(b-1) \geq 1000000 \end{array} \\ C & \text{otherwise} \end{cases}$$

C, in some embodiments, may include a fixed initial cap that applies when the available asset token supply may be low (e.g., under one million units of the asset token). In some embodiments, C may include 82 or some other number. In another embodiment, cap(b) may be calculated as cap(b):=max(0.0001*availableCoins(b−1), 82). In yet another embodiment, availableCoins(b) may include a total value of all asset tokens that are available for sending via transactions during the block b. In some embodiments, the value of availableCoins(b) (called "availableCoinSupply (b)" in the formula below) or may include:

$$availableCoinSupply(b) := totalCoinSupply(b) - \sum_{d \in D(b)} balance(d, b)$$

In another embodiment, totalCoinSupply(b) may include the total number of asset tokens minted as of block number b. D(b) may include the set of all dead-end addresses as of block b. Balance(d, b) may include the balance of dead-end address d as of block b. In other words, the available asset token supply may include the total number of sendable asset tokens. In one embodiment, a dead-end address may include an address that is precluded from having outbound transactions. In those instances, the balance of a dead-end address may increase but not decrease.

In one embodiment, p(b) may include the market price of the asset token during a block b. The market price of the asset token may be determined by the one or more oracles 116, 118. In some embodiments, the market price of the asset token during the block may be based on transaction data of the block.

As can be seen from the formula for calculating the variable quantity of minted asset tokens, mintedAmount(b), the calculation of mintedAmount(b) may be split into four scenarios: initial, no-change, ratchet-up, and ratchet-down. During the initial scenario, which may occur only for the first block, the minted amount may be set to the arbitrary value of 42 or some other value. During the no-change scenario, which may occur in response to the current block not being the first block of an n-block interval, the minted amount may include the minted amount for the prior block.

The ratchet-up scenario, which may occur in response to, at the start of an n-block interval, the market price of the asset token being at or over the target price and the market price is rising or flat when compared to the prior block. In this scenario, the minted amount may include a small increase over the previous interval's minted amount. This increased amount may be limited by the minted amount cap.

Finally, the ratchet-down scenario may occur in response to, at the start of an n-block interval, the market price of the asset token being below the target price and, compared to the prior block, the market price is falling or flat. In this scenario, the ratchet-down portion of the function may gradually reduce the minted amount, dividing the prior minted amount by the adjustment factor subject to a minimum of 0.000001 or some other minimum value. In some embodiments, repeated applications of the formula in the ratchet-down scenario during a prolonged drop in market price of the asset token may lower the minted amount to nearly zero. While the above formula for the minted amount uses "1" as the target price for the asset token, the target price may include a different target price.

In some embodiments, minting a variable quantity of asset tokens may not be sufficient to return an asset token to its target price or maintain the asset token at its target price. In other embodiments, applying a variable transaction fee may help return an asset token to its target price or maintain the asset token at its target price. Applying the transaction fee may include removing at least a portion of the transaction fee from circulation in the blockchain for the asset token type. In one embodiment, a node of the system 100, such as the user node 104, may send or request a transaction with another node, such as the user node 106. The transaction may include a transaction amount. The transaction amount may be expressed in asset tokens. The user node 104 may be charged a transaction fee for sending the transaction. The transaction fee may help maintain the system 100. However, the transaction fee may do more than compensate a proposer node 114 for its computational effort to append a block to the blockchain. The transaction fee may remove asset tokens from circulation in the system 100.

The following formula shows the two parts that the transaction fee may include:

$$transactionFee(t) := computeFee(t) + stabilityFee(t)$$

The computeFee(t) refers to the compute fee and stabilityFee(t) refers to the stability fee for a transaction t. In some embodiments, the transaction fee may include a compute fee. The compute fee may include the portion of the transaction fee which is transferred to a proposer node 114. The sum of compute fees for one or more transactions in the current block may form a compute reward. The transaction fee may also include a stability fee. Charging a stability fee may raise the price of the asset token by reducing the supply of asset tokens when the price of the asset token is below the target price. Variable transaction fees may regulate the asset token price by causing the asset token price to return to the target price.

Once received from the user node 104 that sent the transaction, the stability fee of the transaction may be split into a number of portions. In one embodiment, one portion of the stability will be burned (i.e., transferred to a dead-end address). The burn amount may be sent to a dead-end address, which may have the effect of permanently reducing the available supply of the asset token. Over time, the burn amount may allow asset tokens to respond to a decrease in demand.

In some embodiments, another portion of the stability fee (i.e., a portion that is not the burn amount) may be distributed as a stability reward to one or more nodes that hold asset tokens in a way that may encourage users of the system 100 to hold increased balances at certain times. This distribution may be called a stability amount. A purpose of stability rewards may be twofold: (1) to provide access to network ownership to an expanding circle of users of the blockchain for the asset token type, and (2) to incentivize behavior that supports system 100 utility (e.g. by reducing the quantity of asset tokens available for sale, trading, or other economic activity when the price of the asset token is below the target price). Distributing the stability reward may include sending the stability reward to one or more cryptographic addresses with a limited ability to be withdrawn from the address.

In some embodiments, the system 100 may include a second token type apart from the asset token type that tracks the price of a unit of the target asset. The second token type may include a mining token. The asset token of the blockchain may be associated with a mining token. Thus, a mining token associated with an asset token type that tracks the U.S. dollar may not be associated with an asset token type that tracks gold. A mining token may be associated with a cryptographic address and other meta-information used to securely manage tracking of: (1) performance of mining responsibilities; (2) the recipient address for mining rewards; (3) mining token ownership; and (4) delegation of mining responsibilities to third parties. A specialized smart contract may manage at least a portion of this information. The system 100 may include a number of initial mining tokens.

The disclosed system 100 and method may include a consensus protocol. The consensus protocol may include a formal set of rules that allows a decentralized group of nodes 104 to agree on the advancement of the blockchain, including the handling of transactions and the distribution of incentivizing rewards. Mining using the consensus protocol may proceed one block at a time and may include assembling a block for the blockchain, proposing the block to one or more nodes, validating the block, or other functions. The consensus protocol may include selecting a node as the proposer node 114. For each block, one or more nodes may deterministically select a proposer node 114 from the one or more nodes. The likelihood of the nodes of the system 100 selecting a certain node as the proposer node 114 may be proportional to the number of mining tokens associated with the certain node. One or more nodes that are not selected as the proposer node 114 may act as validator nodes 108, 110, 112 for the duration of the block. Thus, in some embodiments, a node may act as a validator node 108, 110, 112 for one block, and the same node may act as the proposer node 114 for another block.

The proposer node 114 may assemble and propose the next proposed block in the blockchain. The proposer node 114 may assemble a viable proposed block that includes pending transactions. The proposer node 114 may distribute the assembled proposed block to one or more validator nodes 108, 110, 112 for validation. Each validator node 108, 110, 112 may inspect the proposed block for suitability. A validator node 108, 110, 112 may cast a cryptographically-signed vote to accept or reject the proposed block. If a predetermined portion (e.g. two-thirds) of the validator nodes 108, 110, 112 vote to accept the proposed block, the proposer node 114 may commit the proposed block to the blockchain. The proposer node 114 may signal to the system 100 that the proposed block is finalized and is now a block appended to the blockchain. If a predetermined threshold is not reached by the validator nodes 108, 110, 112 to accept the block, the proposed block may be rejected. In response to the proposed block being rejected, the process may begin again with a new proposer node 114 deterministically elected to propose another block.

The proposer node 114 may expend computing resources and energy. The expended resources and energy may include more than the resources and energy that the validator nodes 108, 110, 112 may expend to validate the proposed block. For example, the proposer node 114 may interrogate the blockchain data 120 to determine the amount of asset tokens to be minted, may assemble the block, and may verify the block is distributed properly. All this may occur within a short timeframe, which may be non-trivial. In some embodiments, the processing of blocks may halt without a proposer node 114, however the processing of blocks may occur even if one or more validator nodes 108, 110, 112 leave the system 100 or go inactive.

The proposer node 114 may receive a mining reward in response to successfully proposing and appending a block to the blockchain. The mining reward may include a minted reward and/or a compute reward. The mining reward may also include an oracle reward. In one embodiment, the mining reward 'm' for a block 'b' may be calculated using the following formula:

$$\text{miningReward}(m,b) := \text{mintedReward}(b) + \text{oracleReward}(m,b) + \text{computeReward}(b)$$

The minted reward may include a variable quantity of asset tokens based on a market price, determined by one or more oracles 116, 118, relative to the target price. The minted reward may include a portion of the minted amount, mintedAmount(b), that remains to be given to the proposer node 114 after an oracle deduction is deducted. The oracle reward may include an amount of asset tokens to be given to one or more oracles 116, 118 in response to the oracles 116, 118 submitting asset token prices. The compute reward may include the compute reward as described above.

As can be seen from the above description, by minting the asset token in variable quantities, the system 100 may regulate the asset token price by causing the asset token price to return to the target price or remain at the target price. In some embodiments, charging a transaction fee that removes asset tokens from the asset token supply may also regulate the asset token price.

In one embodiment, the asset token may track a national currency as the target asset. For example, the target asset may include the U.S. dollar, the Euro, the Japanese Yen, or the like. In another embodiment, the target asset may include another cryptocurrency. In some embodiments, the target asset may include a security. For example, the target asset may include a share of stock in a company, a bond, or the like. In another embodiment, the target asset may include a commodity such as oil, gold, or similar commodity. In yet another embodiment, the blockchain may implement a single type of asset token that tracks a target asset. For example, a first blockchain may implement a U.S. dollar-tracking type of asset token and a second blockchain may implement a Euro-tracking asset token type.

In some embodiments, the target price of the asset token may include an amount of a national currency. For example, as mentioned above, the target asset may include the U.S. dollar and the target price may include one U.S. dollar. Other target prices may be used for regulating the value of the asset token. For example, the target price may include five shares of the stock of a certain company, one barrel of oil, seven grams of gold, or the like. In one embodiment, due to supply, demand, other market factors, the price of the asset token may deviate from the target price.

In some embodiments, a block of the blockchain for the asset token may include zero or more transactions. The blockchain may be distributed across multiple nodes that are synchronized such that each node contains consistent blockchain data 120. For example, in some embodiments, the blockchain data of a node may include a copy of the blockchain ledger. In some embodiments, a node may include an entity with an address for the asset token. In other embodiments, a node may not include blockchain data 120. A node without blockchain data 120 may include a client software application that does not participate in mining activities in which, for example, the validator nodes 108, 110, 112, or the proposer node 114 participate.

In one embodiment, the market price of the asset token, p(b), may be determined by an oracle 116, 118. Each oracle 116, 118 may be incentivized to determine a correct market price of the asset token based on publicly available sources. An oracle 116, 118 may report this market price periodically to an associated validator node 108, 110, 112 or another component of the system 100. In one embodiment, an oracle 116, 118 may send the market price by sending an oracle stake to a smart contract. An oracle 116, 118 whose reported market price is within a predetermined accuracy may receive an oracle reward. In some embodiments, the predetermined accuracy may include within one standard deviation of the market price determined by the proposer node 114. This approach may incentivize an oracle 116, 118 to discover and report a trustworthy and accurate consensus value of the market price of the asset token. In one embodiment, an oracle 116, 118 may include a hardware or software implementation executing on a validator node 108, 110, 112 or the proposer node 114.

In other embodiments, the market price of the asset token may be based on information gathered from one or more transactions. For example, the formula for calculating the market price, p(b), may include:

$$p(b) := \frac{\sum_{t \in T(b)} P_t V_t}{\sum_{t \in T(b)} V_t}$$

where T(b) is the set of price-determining transactions for the block b, P(t) is the price of transaction t in the target asset, and V(t) is the volume of the transaction t. In some embodiments, a price of the transaction may be converted from another asset to the target asset. A price-determining transaction may include a transaction that is published on a cryptocurrency exchange. The cryptocurrency exchange may include an exchange trusted, approved, or endorsed by the blockchain system for the asset token. A price determining transaction may include a price expressed in the target asset, a transaction amount expressed in the asset token, and a completion time. The completion time may include a time that is during or before the creation time of the previous block (i.e., b−1) and after the creation time of the block before the previous block (i.e., b−2).

In one embodiment, calculating the compute fee may utilize the following formula:

computeFee(t):=gasUsed(t)gasPrice(t)

where gasUsed(t) may include the gas used in processing transaction t, and gasPrice(t) may include the price of one unit of gas at the time of transaction t. As used herein, "gas" may include a pricing value to process the transaction. In some embodiments, gas may be expressed in asset tokens of the blockchain, another asset token type, or the like. The price of the gas may include a price of the unit of gas. The price may be based on a price from a cryptocurrency exchange, a smart contract, or the like. In some embodiments, the price of the gas may be converted into the asset token of the blockchain. In other embodiments, for simple send transactions, gasUsed(t) may be set to 21,000. For smart contract transactions, the value of gasUsed(t) may be based on the operations triggered by the associated smart contract. In some embodiments, the value of gasPrice(t) may include $2 \times 10^{-8}$. In one embodiment, the sum of the compute fees for all the transactions t in the block b may be sent to the proposer node 114 of the block b, as shown in the formula:

$$computeReward(b) := \sum_{t \in T(b)} computeFee(b, t)$$

where T(b) is the set of transactions in the block b.

In some embodiment, the stability fee may range between 0 and 2% of the transaction amount. In one embodiment, the stability fee may, under normal conditions, be zero. In the abnormal condition of a prolonged drop in demand for the asset token type, the stability fee include up to 2% of the transaction amount or some other percentage amount. The stability fee may be lowered back down to zero once normal conditions return. In another embodiment, the stability fee for a transaction t may be calculated according to the following formula:

$$stabilityFee(t) := \begin{cases} 0 & repeat(block(t)) = -1 \\ \min(1.09^{repeat(block(t))} computeFee(t), & \\ \quad 0.02 amount(t)) & \text{otherwise} \end{cases}$$

where block(t) and amount(t) are the block number and transaction amount, respectively, associated with the transaction t. Repeat(b) for a block b may be defined as:

$$repeat(b) := \begin{cases} -1 & b = 1 \\ repeat(b-1) & b \bmod 900 \neq 1 \\ repeat(b-1) + 1 & b > 1 \ \& \ b \bmod 900 = 1 \ \& \\ & p(b) < 1 \ \& \ p'(b) \leq 0 \\ \max(repeat(b-1)-1, -1) & \text{otherwise} \end{cases}$$

Repeat(b) may track how many times to increment the stability fee. The definition of repeat(b) may imply, in some embodiments, that the stability fee changes at most once every predetermined number of blocks. According to the above formula, the number may include 900 blocks, but in some embodiments, may include another number. A value of −1 is used by this function to signify that the stability fee should be 0.

In another embodiment, the price change rate, p'(b), used in the above formula, may be defined as:

$$p'(b) := \frac{901 \sum_{i \in N(b)} p(i)i - \sum_{i \in N(b)} p(i) \sum_{i \in N(b)} i}{901 \sum_{i \in N(b)} i^2 - \left(\sum_{i \in N(b)} i\right)^2}$$

where N(b) is the set of integers from b−900 to b. This may calculate the change rate over the most recent 900 blocks. In some embodiments, the above formula for calculating p'(b) may include other numbers than 901. For example, the formula may include 241, which may result in calculating the change rate over the last 240 blocks. In some embodiments, the formula above may include numbers other than 901 or 241 which may result in calculating a change rate over a different range of recent blocks.

In one embodiment, the stability fee may include the same value as the compute fee. In response, transactions that impose more computational costs on the system 100 may bear more of the costs of maintaining stability. The stability fee may periodically increase by a small amount. The small amount may include 9% or another amount. The stability fee may increase until it rises to its maximum value. The maximum value may include 2% of the transaction amount or some other value.

In some embodiments, for the benefits of use in a real-time payment system, an estimated stability fee may be used. The estimated stability fee may be easy and quick to calculate. The estimated stability fee may include a value either equal to or slightly above the actual stability fee, assuming the actual transaction takes place within a predetermined amount of time (e.g., 15 minutes) of calculating the estimated stability fee.

In some embodiments, the estimated stability fee may be calculated according to the following formula:

estimatedStabilityFee($t$):=min(1.09*stabilityFee($t$), 0.02amount($t$))

As mentioned above, the stability fee may be split into a predetermined number of portions. In one embodiment, the predetermined number of portions the stability fee may split into may include two portions or more portions. The portions may include equal portions or unequal portions. Furthermore, in some embodiments, the burn amount portion for a stability fee of a block may include half of the sum of all transaction stability fees for a given block:

$$burnAmount(b) := \frac{\sum_{t \in T(b)} stabilityFee(t)}{2}$$

In some embodiments, if 15% per day (on average) of the asset token supply is transacted via on-chain transactions, the burn amount may reduce the asset token supply by over 8% in 30 days and over 41% in 180 days.

In certain embodiments, the distribution of stability rewards to users may be managed via one or more smart contracts called stability contracts. A stability contract may be implemented as a child contract of a single master contract. Each stability contract may store multiple addresses: a source address, a savings address, and a stability reward address. The source address may refer to the original address from which funds are transferred to a savings address. The private keys for the remaining stored addresses may be derived deterministically from the private key of the source address, which may give the source address owner the exclusive ability to move funds out of these other addresses, subject to certain constraints described below.

In another embodiment, to receive a stability reward, a user may create a stability contract for its source address and have moved some asset tokens from its source address into the stability contract's savings address. In some embodiments, a transaction constraint may prevent transactions from a savings address from being sent anywhere other than back to the source address.

In one embodiment, the stability amount may be partitioned into individual stability rewards, one for each stability contract, using the following formula:

$$stabilityReward(b, a) := \left(\frac{savingsBalance(b, a)}{\sum_{x \in A(b)} savingsBalance(b, x)}\right) stabilityAmount(b)$$

where b is a block number, 'a' is a source address with an associated stability contract, A(b) is the set of all source addresses associated with stability contracts as of block b, and savingsBalance(b,x) may denote the balance as of block b of the savings address associated with the smart contract with source address x during block b. In some embodiments, the stability amount may be calculated according to the formula:

$$stabilityAmount(b) := \frac{\sum_{t \in T(b)} stabilityFee(t)}{2}$$

The stability reward for each smart contract may be transferred into the associated stability reward address. A second transaction constraint may prevent this stability reward from being transferred out until the price of the asset token returns to the target price or higher. While a user that owns the savings address may remove funds from his savings address at any time, in some embodiments, the user may only claim the funds in the stability reward address once the price of the asset token returns to the target price or higher. If the user removes the savings address funds before this time, the associated stability reward funds may be forfeited.

In other embodiments, a stability fee rate, s(b), and estimated stability fee rate, e(b), for block b, may be calculated using the following formulas:

$$s(b) := \begin{cases} 0.00001 & b = 1 \\ s(b-1) & b \bmod 240 \neq 1 \\ \min(1.023s(b-1), 0.02) & b > 1 \ \& \ b \bmod 240 = 1 \ \& \ reward(b-1) = \\ & 0.0001 \ \& \ p(b) < 1 \ \& \ p'(b) <= 0 \\ \max\left(\frac{1}{1.023}s(b-1), 0.00001\right) & \text{otherwise} \end{cases}$$

$$e(b) := \begin{cases} \min(1.023s(b), 0.02) & b > 1 \ \& \ reward(b-1) = \\ & 0.0001 \ \& \ p(b) < 1 \ \& \ p'(b) <= 0 \\ s(b) & \text{otherwise} \end{cases}$$

In some embodiments, reward(b−1) may include the quantity of asset tokens minted for the previous block that were rewarded to the proposer node 114 of that block. The quantity of asset tokens minted for the previous block may be calculated using the formula below for mintedAmount (b). In one embodiment, reward(b−1) may include the quantity of asset tokens awarded to the proposer node 114 of the previous block. The quantity of asset tokens awarded to the proposer node 114 of the previous block may be calculated using the formula below for mintedReward(b). The value of p'(b) may include the price change rate for a block b as described herein. In one embodiment, the stability fee for a transaction and the estimated stability fee for a transaction t during block b may be calculated according to the following formulas:

stabilityFee($b,t$):=$s(b)$Amount($t$)

estimatedStabilityFee($b,t$):=$e(b)$Amount($t$)

where Amount(t) is the amount of the transaction in asset tokens.

In some embodiments, a mining token may be held in an address that is separate from an address for the asset token. In some embodiments, they system will mint a predetermined number 1,073,741,824 of mining tokens (e.g. mTokens) or another number of desired tokens. Once the initial mining tokens have been minted, a smart contract feature may prevent additional mining tokens from being created in the future, if desired.

In some embodiments, the consensus protocol may be based on Byzantine Fault Tolerance (BFT). The consensus protocol may require a plurality of nodes (e.g. 104, 106, 108, 114) to be in communication with each other. In some embodiments, the nodes 104 may be connected by a well-defined communications protocol and may each run a mining client program. The communications protocol may include TCP, UDP, or some other communication protocol.

It should be understood that a node (among a plurality of nodes) may perform various roles in the system depending on the work to be done, the desired transaction, or the function to be performed by the node. For example, a node may perform the role as a miner in the network, a validator, a proposer, a voter, and/or other required functions.

In some embodiments, the protocol may include selecting a node from among a plurality of nodes (e.g. 108, 110, 112, 114) that are qualified to perform the mining function and/or serve as a proposer. These qualified nodes are sometimes referred to herein as qualifying nodes based on the criteria discussed below. A qualifying node may include a node (e.g. 110) that stakes a minimum number of mining tokens that it controls. A qualifying node may include a node that has participated as a validator node 108, 110, 112 in a predetermined prior number of blocks. In one embodiment, a certain node may be deterministically selected as a proposer node 114. The selection of a proposer node 114 from a plurality of qualifying nodes 108, 110, 112 may include the number of mining tokens of the qualifying node owns divided by the total number of mining tokens owned by all qualifying nodes. In some embodiments, over time, a qualifying node may be selected as the proposer node 114 with a frequency proportional to the ratio of the number of mining tokens the qualifying node holds to the total tokens held by all qualifying nodes. In order to advance the blockchain, the system 100 may include at least one proposer node 114.

A node (e.g. 108, 110, 112) staking mining tokens may include authorizing one or more entries in a smart contract set up for tracking mining activity. The node (e.g. 108, 110, 112) may separately specify one or more addresses that will receive the asset token rewards associated with these mining tokens if the node (e.g. 108, 110, 112) is selected as the proposer node 114. These reward receipt addresses may be independent of the proposer node 114. The proposer node 114 may reclaim the staked mining tokens after the proposer node's 114 proposed block is accepted or rejected. In some embodiments, in response to the proposed block being determined to be dishonest, the proposer node's 114 staked mining tokens may be forfeited. In other embodiments, the predetermined prior number of blocks may include 10,000 or some other number. In yet other embodiments, the minimum number of staked mining tokens may include 30,000 or another number.

In one embodiment, the predetermined portion of the validator nodes 108, 110, 112 required to accept the block to commit the block may include two-thirds of the validator nodes 108, 110, 112. In another embodiment, the predetermined portion of the validator nodes 108, 110, 112 required to accept the block may include a different portion such as half, three-fourths, or another portion.

In one embodiment, the minted reward may include:

$$mintedReward(b) := mintedAmount(b) - oracleDeduction(b)$$

In one embodiment, the oracle deduction may include a portion of the minted amount that is awarded to one or more oracles 116, 118. This oracle deduction may reward the oracles 116, 118 who submitted prices for the asset token were within a predetermined accuracy. The oracle deduction may be placed into a smart contract. These accumulated oracle rewards may be paid out to an oracle 116, 118 in response to reporting prices. The oracle deduction may include:

$$oracleDeduction(b) := oracleDeductionFraction(b) \\ mintedAmount(b)$$

The oracleDeductionFraction(b) may include a predetermined amount. In some embodiments, the oracleDeductionFraction(b) may include a value between 0 and 0.01 or another number. The value may be adjusted for each block. In some embodiments, an oracle fund may include a balance sufficient to pay out anticipated rewards to oracles 116, 118 which may be distributed via cryptographic addresses associated with the oracle fund, the oracles, and other methods of managing rewards in the system. These adjustments may be based on the transaction activity of a certain period of time. The period of time may include the most recent 24 hours of transaction activity.

In some embodiments, the oracle deduction may include a base oracle reward as calculated by the formula:

$$baseOracleReward(b) := 0.04 \sum_{b-900 < x \leq b} mintedReward(x)$$

The base oracle reward may include a value that is a predetermined portion of a total minted reward minted over a predetermined range of blocks. For example, as depicted in the above formula, the base oracle reward may include 4% of the total minted reward over the last 900 blocks. In some embodiments, the oracle deduction may be zero in response to the proposer node 114 not being qualified as an oracle 116, 118 during the block which the proposer node 114 generates. In some embodiments, the reward may be limited by the actual balance in the oracle fund as expressed in the formula:

$$oracleReward(m, b) := \begin{cases} \min(baseOracleReward(b), oracleFundBalance(b)) & m \text{ is an oracle} \\ 0 & \text{otherwise} \end{cases}$$

In one embodiment, the system 100 may not include the concept of post-creation confirmation. Thus, blocks may not be reversible once created. In some embodiments, the system 100 may process multiple transactions per second. This may include processing 7,000 transactions or more per second. In some embodiments, the per-transaction processing time may include one second.

In some embodiments, the consensus protocol may allow a larger variety of nodes (e.g. 108, 110, 112, 114) to propose a next block in the blockchain. This may result from the consensus protocol not requiring a computationally intensive search for hash solution, which incentivizes nodes to use powerful, energy-wasting mining hardware to outperform other nodes and may result in a small pool of nodes that end up proposing the majority of the new blocks. Instead, the consensus protocol selects the proposer node 114 based on mining token ownership, which may result in a larger pool of nodes(e.g. 108, 110, 112, 114) that propose new blocks for the blockchain. This approach may provide security by allowing a wider variety of nodes (e.g. 108, 110, 112, 114) to propose a next block in the blockchain instead of only a few nodes dominating the production of new blocks. Furthermore, this approach may use less electricity compared to conventional cryptocurrency consensus mechanisms. For example, between 5,000 and 100,000 Bitcoin miners collectively consume approximately 774 megawatts of electricity. By comparison, the disclosed system 100 may include a plurality of nodes (e.g. 108, 110, 112, 114) that may run on low-power machines and consume less than five megawatts of electricity.

Figure 2:
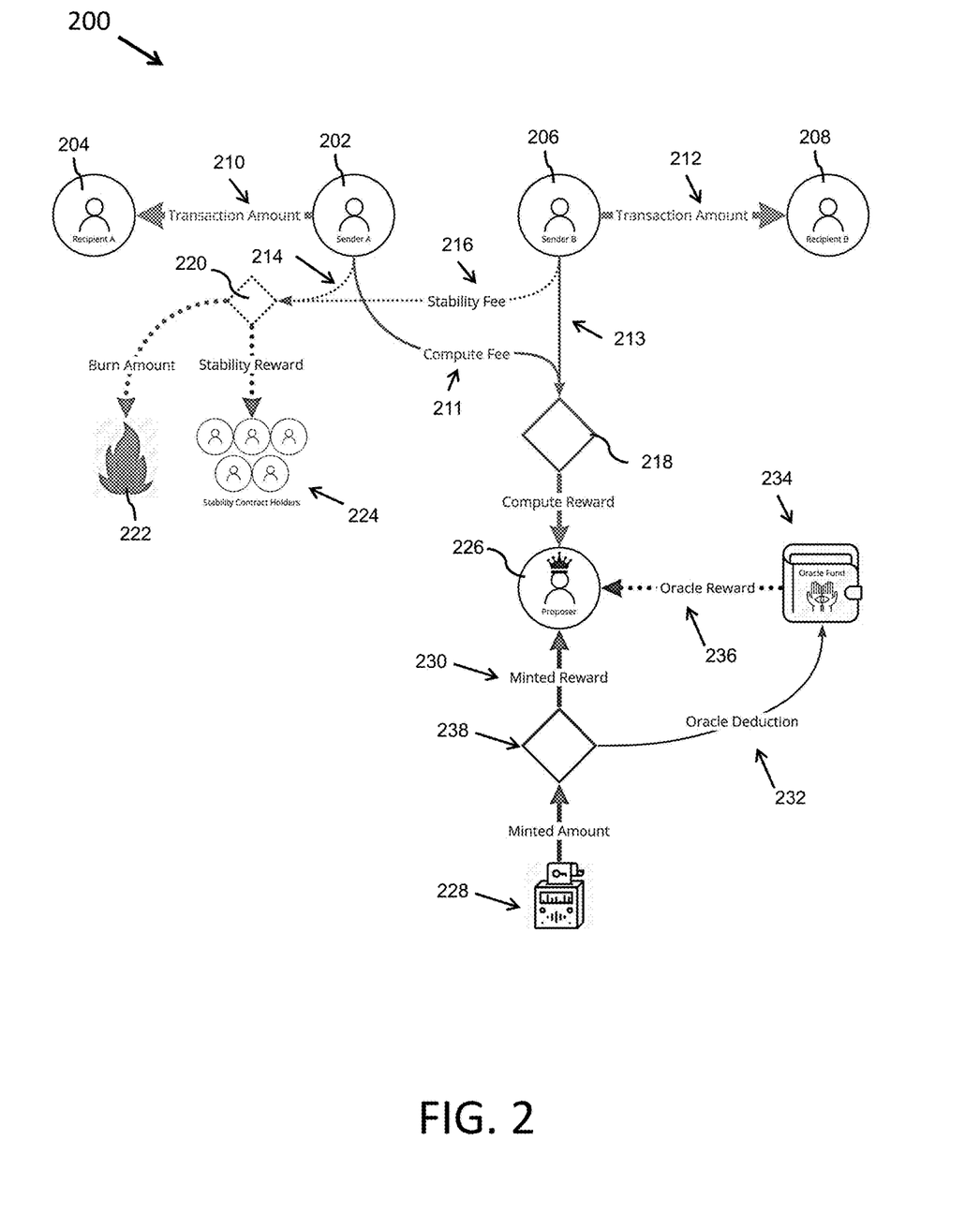
FIG. 2 is another schematic block diagram illustrating one embodiment of a system for distributed, self-regulating, asset-tracking cryptocurrencies.

FIG. 2 depicts one embodiment of a system 200. The system 200 may include one or more elements from the system 100. The system 200 may include a first user 202 (labeled "Sender A"), a second user 204 (labeled "Recipient A"), a third user 206 (labeled "Sender B"), a fourth user 208 (labeled "Recipient B"). Sender A may send a first transaction amount 210 in a transaction to Recipient A. Sender B may send a second transaction amount 212 in a transaction to Recipient B. A transaction in the system may comprise a transaction record that includes the transaction amount (210, 212), the stability fee (214, 216), the compute fee (211, 213), and other transaction data.

The system 200 may charge a first compute fee 211 to Sender A. The system 200 may charge a second compute fee 213 to Sender B. The first and second compute fees 211, 213 may be based on the processing needed to process the first and second transactions. The system 200 may charge a first stability fee 214 to Sender A. The system 200 may charge a second stability fee 216 to Sender B. The first and second stability fees 214, 216 may be calculated based on the respective first and second transaction amounts 210, 212.

In one embodiment, the compute fees 211, 213 may be held until the validators approve a new block proposed by the proposer node 226. The system may also send a portion of the stability fees 214, 216 to a dead-end address 222 to be burned and taken out of circulation. The system may likewise send a portion of the stability fees 214, 216 to contract holders 224 based on one or more stability contracts, as explained above.

In one embodiment, the system may include a proposer node 226. The proposer node 226 may include a node that was selected from the nodes of the system 200. The proposer node 226 may assemble and distribute a new block for the blockchain. In response, the proposer node 226 may determine a minted amount 228. The minted amount 228 may include a variable quantity of asset tokens that varies from block to block. In one embodiment, the proposer node 226 may receive a portion of the minted amount 228 as a minted reward 230 to compensate the proposer node 226 for its processing work on the block. A portion of the minted amount 228 may be divided at step 238 and be sent as an oracle deduction 232 to an oracle fund 234. The oracle fund 234 may hold the oracle deduction 232 and may send portions of the oracle deduction to one or more oracles, such as the oracles 116, 118 of the system 100. In some embodiments, in response to the proposer node 226 including an oracle, the proposer node 226 may receive an oracle reward 236.

Figure 3:
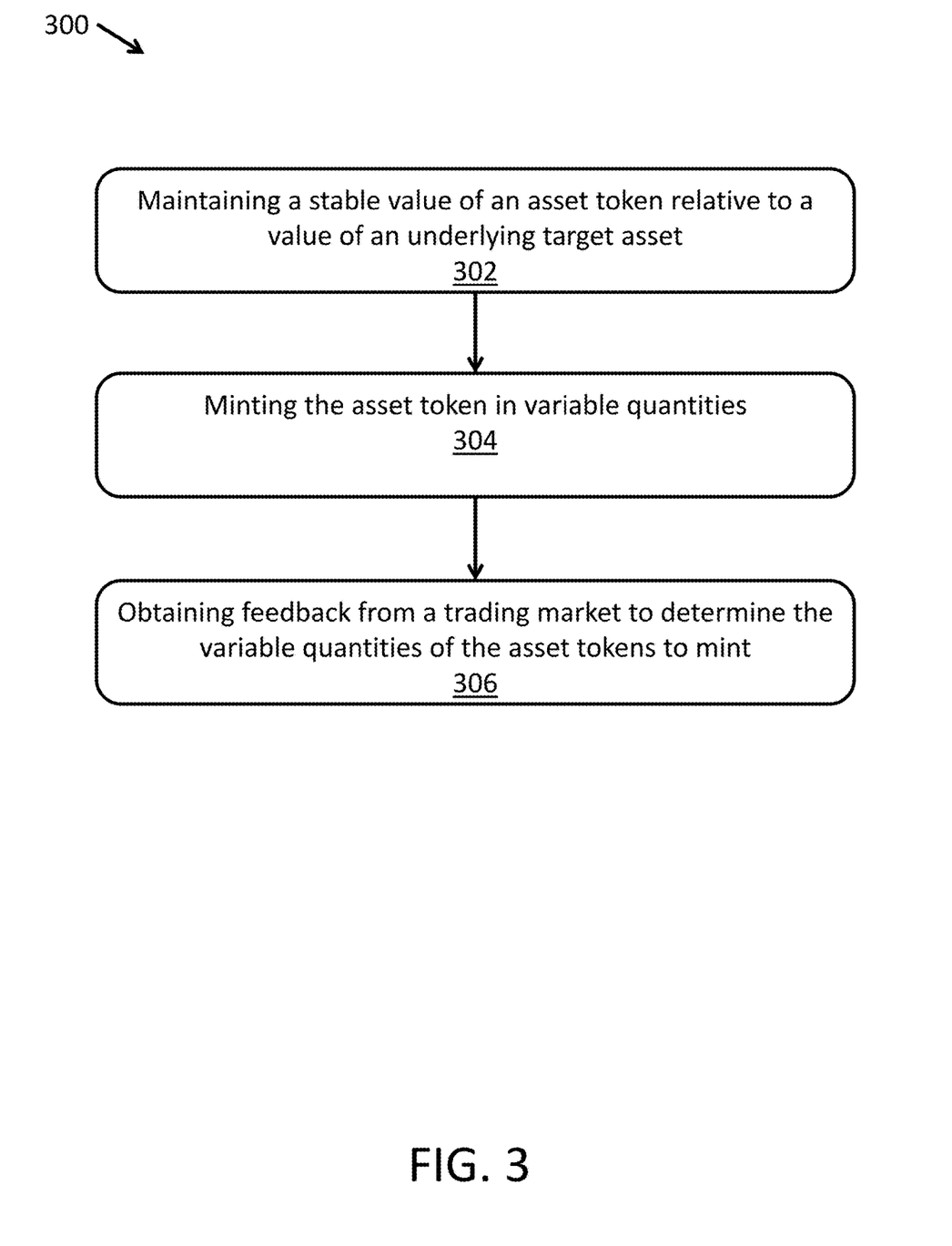
FIG. 3 is a flowchart diagram illustrating one embodiment of a method for distributed, self-regulating, asset-tracking cryptocurrencies.

FIG. 3 depicts one embodiment of a method 300. The method 300 may include maintaining 302 a stable value of an asset token relative to a value of an underlying target asset. The method 300 may include minting 304 the asset token in variable quantities. The method 300 may include obtaining 306 feedback from a trading market to determine the variable quantities of the asset tokens to mint. In some embodiments, obtaining feedback from the trading market may include obtaining a market price of the asset token.

Figure 4:
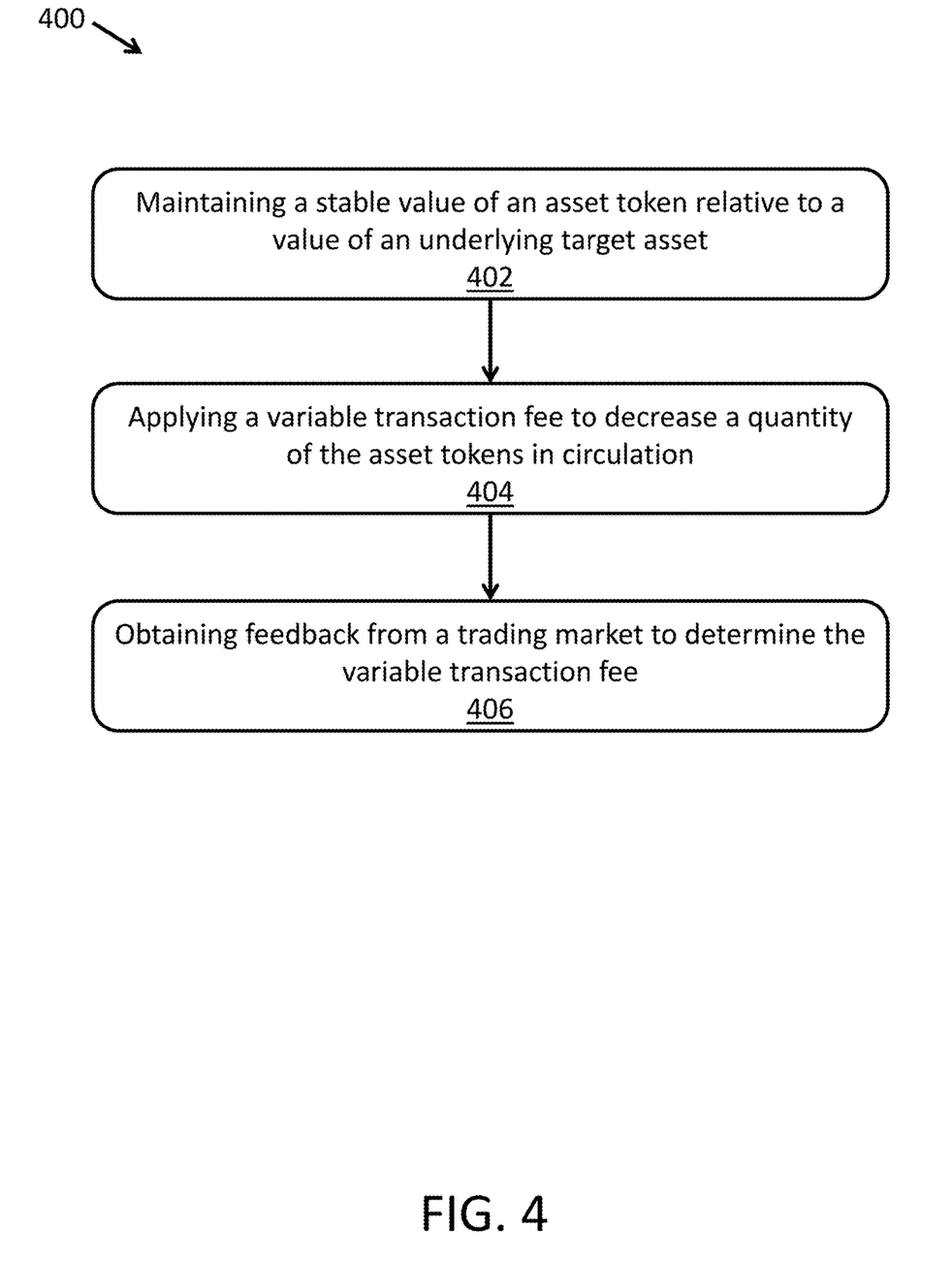
FIG. 4 is a flowchart diagram illustrating another embodiment of a method for distributed, self-regulating, asset-tracking cryptocurrencies.

FIG. 4 depicts one embodiment of a method 400. The method 400 may include maintaining 402 a stable value of an asset token relative to a value of an underlying target asset. The method 400 may include applying 404 a variable transaction fee to decrease a quantity of the asset tokens in circulation. The method 400 may include obtaining 406 feedback from a trading market to determine the variable transaction fee.

Figure 5:
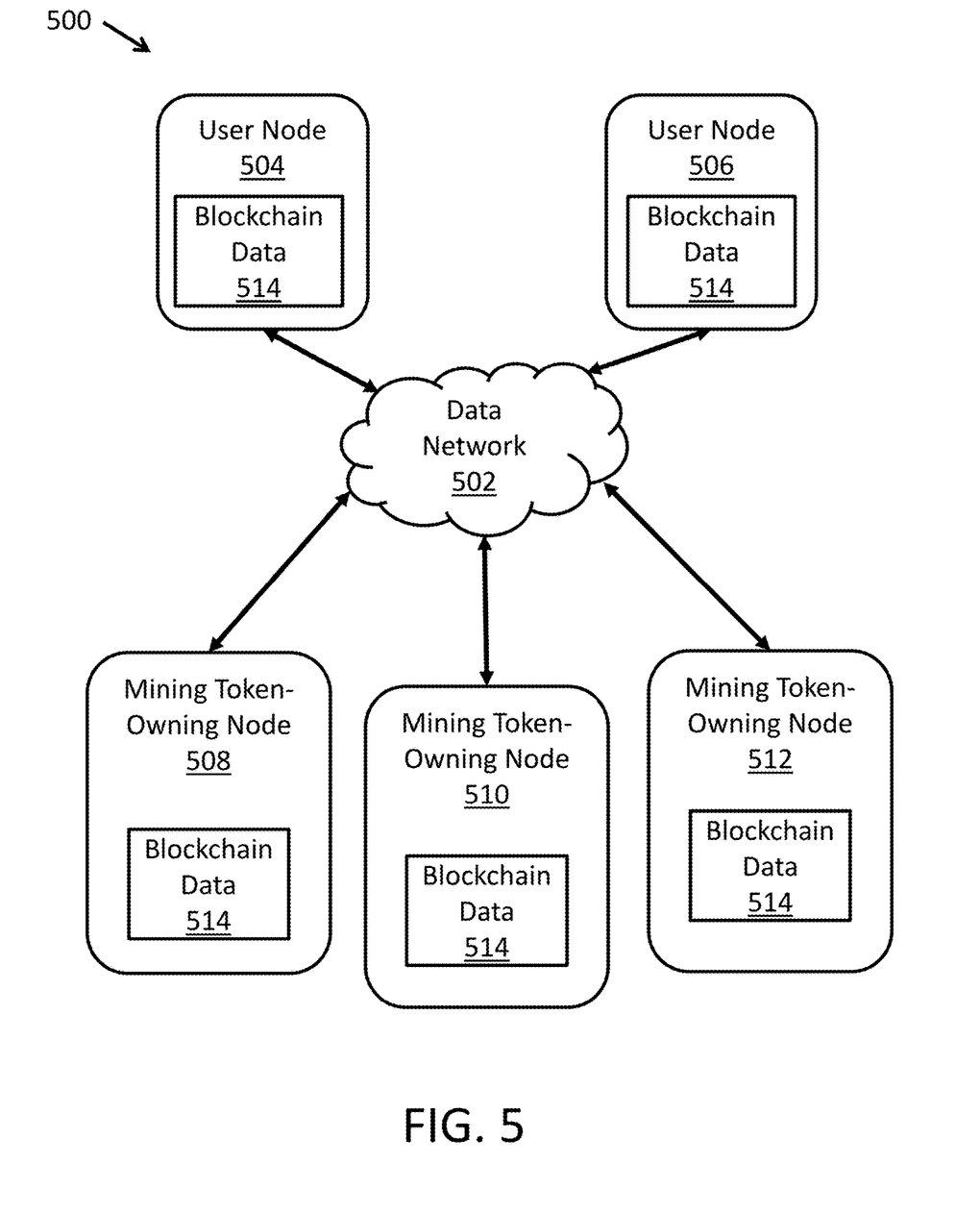
FIG. 5 is a schematic block diagram illustrating another embodiment for a system for distributed, self-regulating, asset-tracking cryptocurrencies.

FIG. 5 depicts another embodiment of the system and method 500. The system 500 may include a data network 502. The system 500 may include a plurality of nodes. The plurality of nodes may include one or more user nodes 504, 506. A user node 504, 506 may include a node that does not own any mining tokens or a node that owns a mining token but has not registered it in a block reward roster. The plurality of nodes may include one or more mining token-owning nodes 508, 510, 512. A mining token-owning node 508, 510, 512 may include a node that owns one or more mining tokens and has registered at least one of them on the block reward roster. One or more of the plurality of nodes may include blockchain data 514. In some embodiments, the consensus protocol may include a consensus protocol that rewards a mining token-owning node (e.g. 508, 510, or 512) with the variable quantity of minted asset tokens based on mining sectors. A mining token-owning node (e.g. 508, 510, or 512) may hold the exclusive right to mine within a mining sector associated with the mining token. To exercise this right, a mining token-owning node (e.g. 508, 510, or 512) may register its mining tokens in a block reward roster. The registration may include cryptographically proving that the mining token-owning node (e.g. 508, 510, or 512) controls the private keys associated with the ownership addresses of the mining tokens. In one embodiment, a mining token-owning node (e.g. 508, 510, or 512) may generate a proposed block. The mining token-owning node (e.g. 508, 510, or 512) may use the proposed block as input to a hashing function. The resulting hash may correspond to a mining sector that is associated with a mining token. The mining token-owning node (e.g. 508, 510, or 512) that controls the associated mining token may receive the variable quantity of minted asset tokens.

In some embodiments, in response to the proposed block's hash corresponding to a mining sector without an associated mining token, a mining token-owning node (e.g. 508, 510, or 512) may reject the proposed block and a new proposed block may be generated. A mining sector may not have a corresponding mining token in response to the mining token not being registered, the mining token not existing yet, or some other reason. In one embodiment, a first mining token-owning node (e.g. 508) that owns a mining token may contract with a second node (which may include a node that is not a mining token-owning node (e.g. the user node 504)) to mine on the first mining token-owning node's (e.g. 508) behalf. In some embodiments, this may include the first mining token-owning node (e.g. 508) registering the mining token on the block reward roster, and the block reward roster indicating that a cryptographic address associated with the second node (e.g. 504) is to receive at least a portion of the variable quantity of minted asset tokens.

As can be seen from the above description, embodiments of the systems and methods described herein may improve asset-tracking cryptocurrencies over conventional systems and methods. The systems and methods herein may perform unconventional steps such as varying the minted asset token quantity, varying the fees applied to transactions, evaluating whether the market price of one or more previous blocks is approaching the target price, and/or obtaining a market price received from one or more oracles. Furthermore, by performing the unconventional steps of varying the transaction fees, varying the minting results, adjusting those amounts based upon accurate market pricing, and reaching consensus, the systems and methods described herein may result in an asset token that tracks a target price of a target asset.

Furthermore, the systems and method described herein may improve the functionality and operation of a computing device. As described herein, the computer-implemented methods perform the unconventional steps of varying the mining reward and fees from block to block to calculate a minting result that results in a more stable asset-tracking cryptocurrency. Furthermore, in order to reach a consensus regarding which block of transactions to add to the blockchain, the unconventional consensus algorithm does not use an energy-inefficient proof-of-work algorithm but uses the unconventional components of energy-efficient mining tokens, a proposer node, and one or more validator nodes to determine the next block in the blockchain.

In some embodiments, the variable minting and the variable removal of asset tokens, as described herein, may cause the price of the asset token to revert to its target price. This tendency to revert to the target price may become recognized among users. In response, three second-order effects may emerge. First, since the target price may be the only particular price to which the asset token has a natural inclination to return, it may include a game-theoretic focal (or Schelling) point. The absence of communication and trust among disparate users along with the status of the target price as a focal point increase the likelihood that the price of asset token will return to the target price.

Second, in another embodiment, in response to deviations of the asset token price from the target price, the deviations may give rise to short-term profit opportunities for users. The source of these opportunities may include the difference between the time horizon of relatively patient users and that of other users for whom the short-term need to move into or out of the asset token exceeds concern over these price deviations. Although some users may exploit these profit opportunities purely for self-interest, their trading activity may have the positive effect of accelerating the return to parity. Third, confidence in the reversion to the target price may strengthen further as users observe a history of such reversion in the marketplace.

In some embodiments, the systems and methods described herein may provide benefits to a variety of different parties. Some of these parties may include consumers of goods and services, merchants of goods and services, investors, traders, cryptocurrency miners, or software developers. Many of these parties may benefit from a stable asset token that does not suffer the volatility of other cryptocurrencies.

For example, a consumer may include a person, business, or other party that may exchange the asset token for goods or services. A consumer may avoid using a cryptocurrency to purchase goods or services because the consumer may worry that the price of the cryptocurrency will drop between purchase of the cryptocurrency and use of the cryptocurrency to purchase goods or service, and thus, the consumer would lose money. A stable asset token may allow a consumer to purchase goods and services without having to worry about such cryptocurrency price volatility. Similarly, a merchant that provides goods or services may benefit from the asset token stability as well. A stable asset token may help consumers or merchants avoid other volatility such as volatility associated with unstable fiat currencies.

In another embodiment, a consumer may have access to the asset token but may not have access to banking services. For example, a consumer may have a smartphone that may include a client program that allows the consumer to send and receive the asset token. The consumer may be able to use bank-like services for the asset token, such as storing asset tokens in a secure account, make purchases without having to use cash, or other similar banking service. Furthermore, a consumer may be able to make purchases in a software application without having to have a bank account or credit card. Software developers may incorporate asset token payment functionality into their software to expand their customer base.

Although the above discussion has identified some novel aspects of the systems and methods disclosed herein, improvements over conventional systems, and improvements to computing devices and functionality, it should be understood that these improvements are exemplary and other improvements will be apparent from the disclosure herein.

Thus, although there have been described particular embodiments of the present invention of new and useful SYSTEM AND METHOD OF DISTRIBUTED, SELF-REGULATING, ASSET-TRACKING CRYPTOCURRENCIES, it is not intended that such references be construed as limitations upon the scope of this invention. While several embodiments have been described herein, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
maintaining a stable value of an asset token relative to a value of an underlying target asset;
receiving, from a proposer node, a proposed block, wherein
the proposer node includes a first computing device configured to assemble the proposed block from one or more pending transactions,
the proposer node is deterministically elected from a plurality of validator nodes, and
the plurality of validator nodes elect the proposer node based on a proportion of mining tokens the proposer node controls;
casting, at a validator node of the plurality of validator nodes, a cryptographically signed vote to accept or reject the proposed block, wherein the validator node includes a second computing device configured to inspect the proposed block to determine validity of the proposed block;
minting the asset token in variable quantities; and
obtaining feedback from a trading market to determine the variable quantities of the asset tokens to mint.

2. The computer-implemented method of claim 1, further comprising applying a variable transaction fee to decrease a quantity of the asset tokens in circulation.

3. The computer-implemented method of claim 1, wherein obtaining feedback from the trading market comprises receiving a market price of the asset token from an oracle.

4. The computer-implemented method of claim 3, wherein receiving the market price of the asset token from the oracle includes a market price from a cryptocurrency exchange platform.

5. The computer-implemented method of claim 1, wherein minting the asset token in variable quantities is in response to:
the proposer node assembling the proposed block to add to a blockchain; and
receiving a predetermined portion of acceptances for the proposed block from at least one validator node of the plurality of validator nodes of a blockchain network.

6. The computer-implemented method of claim 5, wherein the predetermined portion comprises two-thirds of the plurality of validator nodes voting in the blockchain network.

7. The computer-implemented method of claim 1, further comprising sending a portion of the minted asset token quantity to an oracle.

8. The computer-implemented method of claim 1, wherein the underlying target asset comprises at least one of a national currency or a basket of national currencies.

9. The computer-implemented method of claim 1, wherein the underlying target asset comprises at least one of a cryptocurrency or a basket of cryptocurrencies.

10. The computer-implemented method of claim 1, wherein the underlying target asset comprises at least one of a stock or a basket of stocks.

11. The computer-implemented method of claim 1, wherein the underlying target asset comprises at least one of a commodity or a basket of commodities.

12. The computer-implemented method of claim 1, wherein the underlying target asset comprises at least one of a financial asset or a basket of financial assets.

13. The computer-implemented method of claim 1, wherein minting the asset token in variable quantities is based on a minting quantity of at least one previous block in a blockchain for the asset token.

14. The computer-implemented method of claim 13, wherein the variable quantity is higher than the minting quantity of the at least one previous block in response to a market price of the asset token being higher than a target price of the asset token.

15. The computer-implemented method of claim 13, wherein the variable quantity is lower than the minting quantity of the at least one previous block in response to a market price of the asset token being equal to or lower than a target price of the asset token.

16. The computer-implemented method of claim 13, wherein a mathematical function for calculating the variable quantity mintedAmount(b) includes:

$$mintedAmount(b) := \begin{cases} 42 & b = 1 & \text{(initial)} \\ mintedAmount(b-1) & b \bmod n \neq 1 & \text{(no-change)} \\ \min(UP \times mintedAmount(b-1), cap(b)) & \begin{array}{l} b > 1, b \bmod n = 1, \\ p(b) \geq p(b-1) \geq 1 \end{array} & \text{(ratchet-up)} \\ \max\left(\frac{mintedAmount(b-1)}{DOWN}, 0.000001\right) & \text{otherwise} & \text{(ratchet-down)} \end{cases}$$

wherein
b is a block number,
UP is a first adjustment factor,
DOWN is a second adjustment factor,
cap(b) is a minted amount cap for a block specified by the block number b,
n in an interval size, and
p(b) is a market price of the asset token for the block specified by the block number b.

17. The computer-implemented method of claim 16, wherein a mathematical function for calculating p(b) includes:

$$p(b) := \frac{\sum_{t \in T(b)} P_t V_t}{\sum_{t \in T(b)} V_t}$$

wherein
T(b) is a plurality of price-determining transactions for the block specified by the block number b, t is a price-determining transaction within the plurality of price-determining transactions, P(t) is a price of the transaction t in the target asset, and V(t) is the volume of the transaction t.

* * * * *